Patented Feb. 4, 1936

2,029,568

UNITED STATES PATENT OFFICE 2,029,568

PROCESS FOR PRINTING ACETATE ARTIFICIAL SILK

Wolfgang Jaeck, Basel, and Arthur Schürch, Riehen, near Basel, Switzerland, assignors to firm of Society of Chemical Industry in Basle, Basel, Switzerland No Drawing. Application October 15, 1934, Serial No. 748,424. In Switzerland October 21, 1933

12 Claims. (Cl. 8—5)

This invention relates to a process of printing acetate artificial silk fast tints by means of dyestuffs containing metals in complex union.

As dyestuffs containing metal in complex union there may be used, for example, the metal compounds of dyestuffs containing the groups which unite with metals and belong to the anthraquinone series, triarylmethane series or azo series and in the latter case mono- or poly-azo dyestuffs. Dyestuffs of the anthraquinone series containing the groups which unite with metals are dyestuffs containing two hydroxyl groups standing in ortho-position to each other, whereas the dyestuffs of the triarylmethane series containing the groups which unite with metal binding groups possess the so-called salicylic acid grouping, i. e. such a grouping where a hydroxyl group is present in ortho-position to a carboxyl group. Dyestuffs of the azo series containing the groups which unite with metals are the ortho-hydroxy dyestuffs and the ortho-carboxy dyestuffs, as well as such dyestuffs which contain a carboxyl group in ortho-position to a hydroxyl-group. The metaliferous dyestuffs may contain either one metal only, for example, chromium, copper, nickel, cobalt, titanium, vanadium, manganese or iron, or they may contain several metals. Well suited for the purpose are the metal compounds of the azo-dyestuffs, particularly of the ortho-hydroxy-azo-dyestuffs, and of those which are sparingly soluble to insoluble in water, for instance, owing to the absence of sulfonic or carboxylic groups, give, in respect of fixation, fastness and yield, particularly good results, and which contain as metals manganese, iron, cobalt or nickel, i. e. such metals whose atomic weights lie between 55 and 59.

For printing acetate artificial silk in a manner described by this invention it is particularly advantageous, especially in the case of dye-stuffs sparingly soluble to insoluble in water, to use the dyestuff in the form of a paste, for example, a paste obtained by grinding the filter-press cake or, in the form of a dry dyestuff preparation which contains the dyestuff in a particularly favourable form for the purpose of printing. These pastes or color preparations may contain, on the one hand, a hydro-tropic agent, for instance, sulfite cellulose waste liquor, ethanolamine, hexamethylenetetramine, urea or a derivative thereof or a soluble salt or an aliphatic-aromatic or hydro-aromatic-sulfonic or -carboxylic acid such as the alkali salts of benzene-sulfonic acid, dimethyl-sulfanilic acid, phthalic acid, tetrahydronaphthalene-sulfonic acid, phenoxy-acetic acid or a sulfamide such as para-toluene sulfamide; and on the other hand a water soluble alcohol such as glycerine, ethyl alcohol, ethylene glycol, thio-diglycol, an oxidation product of thio-diglycol, or a condensation product of a polyhydric alcohol with urea either alone or together with a hydrotropic agent. Furthermore, the dyestuff paste or preparation may be made with the addition of a product of soapy nature such as ordinary soaps or sulfonated castor oil, for instance, Turkey red oil, as well as of metal compounds such as a compound of iron, copper or aluminium. All these additions may, in many cases, be incorporated with the printing paste instead of with the dyestuff.

The operation of printing the acetate artificial silk by this process is similar to that of printing acetate artificial silk by the usual processes.

The invention is illustrated by the following examples, the relationship between parts by weight and parts by volume being that which exists between the kilogram and the litre:—

Example 1

A printing paste is prepared by dissolving cold 20 parts by weight of the nickeliferous dyestuff of the formula

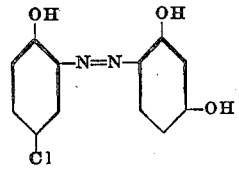

from diazotized 4-chloro-2-amino-1-phenol and resorcinol in 230 parts by volume of alcohol mixed with 50 parts by volume of glycerine, then this solution is introduced into 700 parts of gum (1:1).

Acetate artificial silk is printed with this printing paste, dried, steamed for one hour in a steam chest under ¼ atmosphere pressure and washed; the print produced is a fast reddish-orange.

Example 2

A printing paste is prepared by stirring 20 parts of the manganiferous azo-dyestuff of the formula

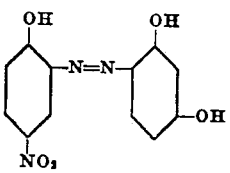

from diazotized 4-nitro-2-amino-1-phenol and resorcinol at 60° C. with 230 parts by weight of water and adding 50 parts by volume of glycerine and 700 parts of gum (1:1).

Acetate artificial silk is printed with this paste, dried, steamed for one hour in a steam chest under ¼ atmosphere pressure and washed and soaped at 60° C.; the print is a fast brown tone.

An olive-brown is produced by using the ferruginous dyestuff from diazotized 4-chloro-2-amino-1-phenol and resorcinol, while the ferruginous dyestuff from diazotized 4-chloro-2-amino-1-phenol and 2-hydroxynaphthalene yields, when printed on acetate artificial silk, a fast brown.

Example 3

20 parts of a powder, obtained by grinding 40 parts of the nickeliferous dyestuff from diazotized 4-chloro-2-amino-1-phenol and resorcinol with 60 parts of sulfite cellulose waste liquor in the form of a powder, or which may also be obtained by intimately grinding and evaporating 40 parts of the dyestuff with 120 parts of sulfite cellulose waste liquor free from lime, are made into a paste with 280 parts of luke-warm water and introduced into 700 parts of gum (1:1), while stirring.

Acetate artificial silk is printed with this printing color. After drying, steaming for ½ to 1 hour, washing and soaping an acetate artificial silk printed a reddish orange shade is obtained.

The following table contains a series of dyestuffs to be used according to the present process, and the shades obtainable therewith:—

| No. | Dyestuff | Metal | Color of the printed acetate artificial silk |
|---|---|---|---|
| 1 | (OH, N=N-C(CO-NH)-C(NH)-CO, OH; NO₂) | Fe | Yellow. |
| 2 | (OH, N=N-C-C-CH₃, HO-C-N, N-phenyl; Cl) | Mn | Reddish yellow. |
| 3 | ...do... | About 50% of Zn + about 50% of Cu | Yellow. |
| 4 | ...do... | Fe | Do. |
| 5 | ...do... | Co | Do. |
| 6 | ...do... | About 20% of Co + about 80% of Al | Gold-orange. |
| 7 | ...do... | Ni | Yellow. |
| 8 | (OH, N=N-C-C-CH₃, HO-C-N, N-phenyl; NO₂) | Cr | Orange. |
| 9 | (OH, N=N-C-C-CH₃, HO-C-N, N-phenyl; NO₂) | Cr | Bluish red. |
| 10 | (OH, N=N-, HO-, naphthalene; Cl) | Al | Red. |
| 11 | ...do... | Co | Bluish red. |
| 12 | ...do... | Al | Red. |
| 13 | ...do... | Fe | Brown. |
| 14 | ...do... | About 50% of Co + about 50% of Ni | Reddish violet. |
| 15 | ...do... | About 20% of Co + about 80% of Cu | Do. |
| 16 | ...do... | About 30% of Fe + about 50% of Al + about 20% of Cu | Reddish brown. |
| 17 | ...do... | About 50% of Cr + about 50% of Co | Reddish violet. |
| 18 | ...do... | About 50% of Cr + about 50% of Ni | Do. |
| 19 | ...do... | About 50% of Cr + about 50% of Fe | Violet brown. |
| 20 | ...do... | About 60% of Al + about 40% of Co | Reddish violet. |
| 21 | ...do... | About 50% of Ni + about 50% of Cu | Pink. |
| 22 | ...do... | Cr | Violet. |
| 23 | (OH, N=N-, OH, -OH; NO₂) | About 30% of Fe + about 50% of Al + about 20% of Cu | Brown. |
| 24 | ...do... | Al | Orange. |
| 25 | ...do... | About 80% of Cr + about 20% of Ni | Red-violet. |

| No. | Dyestuff containing metal in complex union | | Color of the printed acetate artificial silk | No. | Dyestuff containing metal in complex union | | Color of the printed acetate artificial silk |
|---|---|---|---|---|---|---|---|
| | Dyestuff | Metal | | | Dyestuff | Metal | |
| 26 | 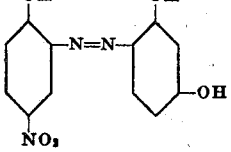 | About 50% of Al + about 50% of Co. | Orange. | 46 | 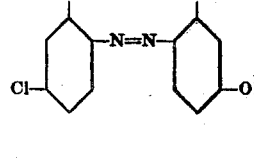 | Cr | Grey. |
| 27 | ___do___ | Co | Red. | | | | |
| 28 | ___do___ | About 50% of Cr+about 50% of Ni. | Beige (ecru). | | | | |
| 29 | ___do___ | Ni | Reddish orange. | 47 | 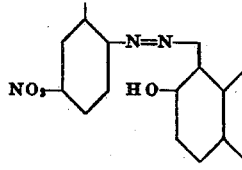 | Ni | Orange. |
| 30 | ___do___ | About 80% of Cr+about 20% of Cu. | Gold-orange. | | | | |
| 31 | ___do___ | About 60% of Al+about 40% of Cu. | Reddish orange. | 48 | 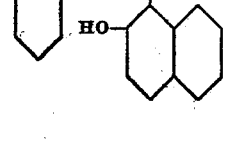 | Fe | Olive. |
| 32 | ___do___ | About 60% of Al+about 40% of Ni. | Do. | | | | |
| 33 | ___do___ | About 50% of Ni+about 50% of Zn. | Orange. | | | | |
| 34 | 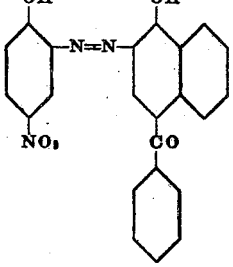 | Mn | Yellow. | 49 | 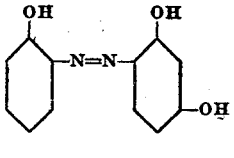 | Al | Red. |
| 35 | ___do___ | Al | Gold-orange. | 50 | ___do___ | Co | Grey. |
| 36 | ___do___ | About 60% of Co+about 40% of Cu. | Beige (ecru). | 51 | ___do___ | Ni | Violet. |
| 37 | ___do___ | About 20% of Ni+about 80% of Cu. | Pink. | 52 | ___do___ | About 50% of Cr+about 50% of Co. | Grey. |
| 38 | ___do___ | About 30% of Fe+about 70% of Ni. | Beige (ecru). | 53 | ___do___ | About 20% of Fe+about 20% of Al+about 60% of Cu. | Red-violet. |
| 39 | ___do___ | About 50% of Ni+about 50% of Zn. | Orange. | 54 | ___do___ | About 50% of Co+about 50% of Cu. | Brown-violet. |
| 40 | (structure with OH, N=N, HO, SO₂NH₂, naphthalene) | About 20% of Ni+about 50% of Fe+about 30% of Sn. | Brown. | 55 | ___do___ | About 50% of Ni+about 50% of Zn. | Violet. |
| | | | | 56 | ___do___ | Cr | Grey. |
| | | | | 57 | (structure with OH, N=N, HO, naphthalene) | About 50% of Cu+about 50% of Zn. | Red-brown. |
| 41 | ___do___ | About 50% of Fe+about 50% of Mn. | Do. | | | | |
| 42 | ___do___ | Fe | Do. | | | | |
| 43 | ___do___ | Ni | Pink. | | | | |
| 44 | ___do___ | Mn | Orange. | 58 | ___do___ | Al | Scarlet red. |
| 45 | ___do___ | About 50% of Al+about 50% of Zn. | Red. | 59 | ___do___ | Ni | Do. |
| | | | | 60 | ___do___ | Mn | Do. |

| No. | Dyestuff containing metal in complex union | | Color of the printed acetate artificial silk | No. | Dyestuff containing metal in complex union | | Color of the printed acetate artificial silk |
|---|---|---|---|---|---|---|---|
| | Dyestuff | Metal | | | Dyestuff | Metal | |
| 61 | OH, Cl, N=N, HO, (naphthalene) | Co | Reddish violet. | 76 | OH, N=N, H₂N, SO₂NH₂, (naphthalene) | Fe | Brown. |
| 62 | ——do—— | Ni | Bordeaux. | 77 | ——do—— | Mn | Orange. |
| 63 | ——do—— | Mn | Red-brown. | 78 | ——do—— | Cr | Beige (ecru). |
| 64 | ——do—— | About 50% of Mn + about 50% of Ni. | Red. | 79 | OH, NO₂, N=N, H₂N, Cl, (naphthalene) | Fe | Reddish violet. |
| 65 | OH, Cl, N=N-C, HO-C, C-CH₃, N-phenyl | Mn | Yellow. | 80 | ——do—— | Cr | Grey. |
| | | | | 81 | COOH, N=N, H₂N, (naphthalene) | Fe | Brown. |
| 66 | OH, N=N, H₂N, Cl, (naphthalene) | Ni | Violet-brown. | 82 | OH, N=N, H₂N, (naphthalene) | Ni | Violet-brown. |
| 67 | ——do—— | About 50% of Co + about 50% of Cu. | Reddish orange. | 83 | ——do—— | About 50% of Fe + about 50% of Sn | Gold-orange. |
| 68 | ——do—— | About 20% of Fe + about 50% of Al + about 30% of Cu. | Pink. | 84 | ——do—— | Fe | Do. |
| | | | | 85 | ——do—— | Co | Grey. |
| 69 | ——do—— | About 25% of Co + about 50% of Al + about 25% of Cu. | Violet. | 86 | OH, N=N, NH₂, HO, Cl, (naphthalene) | Ni | Blue-grey. |
| 70 | ——do—— | About 20% of Co + about 80% of Fe. | Grey. | 87 | ——do—— | Co | Grey. |
| 71 | ——do—— | About 20% of Mn + about 80% of Fe. | Brown. | 88 | ——do—— | Cr | Do. |
| 72 | ——do—— | About 50% of Ni + about 50% of Zn. | Orange. | 89 | OH, NO₂, N=N, NH₂, HO, NO₂, (naphthalene) | Co | Do. |
| 73 | ——do—— | Cr | Beige (ecru). | | | | |
| 74 | OH, NO₂, N=N, H₂N, (naphthalene) | Fe | Pink. | 90 | OH, N=N, HO, Cl, COOH, (naphthalene) | Co | Olive. |
| 75 | ——do—— | Cr | Grey. | | | | |

| No. | Dyestuff containing metal in complex union | | Color of the printed acetate artificial silk |
|---|---|---|---|
| | Dyestuff | Metal | |
| 91 | [structure] | Fe | Yellow. |
| 92 | [structure] | Cr | Bluish violet. |
| 93 | [structure] | Cr | Olive. |
| 94 | [structure] | Cr | Bordeaux. |
| 95 | [structure] | Cr | Violet. |
| 96 | [structure] | Cr | Blue-green. |
| 97 | [structure] | Cr | Reddish blue. |
| 98 | [structure] | Cu | Violet. |
| 99 | [structure] | Cr | Green-blue. |
| 100 | [structure] | Cr | Violet. |
| 101 | [structure] | Cr | Do. |
| 102 | [structure] | Cr | Grey. |
| 103 | [structure] | Cr | Blue-green. |
| 104 | [structure] | Cr | Grey-blue. |

| No. | Dyestuff (containing metal in complex union) | Metal | Color of the printed acetate artificial silk |
|---|---|---|---|
| 105 | [structure] | Cu. | Violet. |
| 106 | [structure] | Ni. | Grey. |
| 107 | [structure] | Cr. | Yellow. |
| 108 | [structure] | Cr. | Do. |
| 109 | [structure] | Cr. | Blue. |
| 110 | [structure] | Cr. | Do. |
| 111 | [structure] | Cr. | Pink. |
| 112 | [structure] | Cr. | Green. |
| 113 | [structure] | Cr. | Brown. |
| 114 | [structure] | Cr. | Red. |
| 115 | [structure] | Cr. | Bordeaux. |
| 116 | [structure] | Cr. | Yellow. |
| 117 | [structure] | Cr. | Do. |

What we claim is:—

1. Process for printing acetate artificial silk, consisting in printing acetate artificial silk with dyestuffs containing metal in complex union which are sparingly soluble to insoluble in water.

2. Process for printing acetate artificial silk, consisting in printing acetate artificial silk with ortho-hydroxyazo-dyestuffs containing metal in complex union which are sparingly soluble to insoluble in water.

3. Process for printing acetate artificial silk, consisting in printing acetate artificial silk with ortho-hydroxyazo-dyestuffs containing metal of the atomic weight 55 to 59 in complex union, which dyestuffs are sparingly soluble to insoluble in water.

4. Process for printing acetate artificial silk, consisting in printing acetate artificial silk with ortho-hydroxyazo-dyestuffs containing metal of the atomic weight 55 to 59 in complex union and resorcinol as coupling component, which dyestuffs are sparingly soluble to insoluble in water.

5. Process for printing acetate artificial silk, consisting in printing acetate artificial silk with ortho-hydroxyazo-dyestuffs of the formula

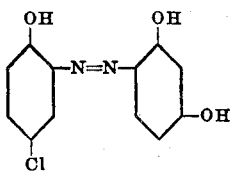

containing metal of the atomic weight 55 to 59 in complex union.

6. Process for printing acetate artificial silk, consisting in printing acetate artificial silk with ortho-hydroxyazo-dyestuffs of the formula

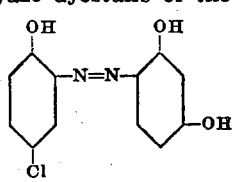

containing nickel in complex union.

7. A composition of matter, consisting of acetate artificial silk which has been printed with azo-dyestuffs containing metal in complex union which are sparingly soluble to insoluble in water.

8. A composition of matter, consisting of acetate artificial silk which has been printed with ortho-hydroxyazo-dyestuffs containing metal in complex union which are sparingly soluble to insoluble in water.

9. A composition of matter, consisting of acetate artificial silk which has been printed with ortho-hydroxyazo-dyestuffs containing metal of the atomic weight 55 to 59 in complex union, which dyestuffs are sparingly soluble to insoluble in water.

10. A composition of matter, consisting of acetate artificial silk which has been printed with ortho-hydroxyazo-dyestuffs containing metal of the atomic weight 55 to 59 in complex union and resorcinol as coupling component, which dyestuffs are sparingly soluble to insoluble in water.

11. A composition of matter, consisting of acetate artificial silk which has been printed with ortho-hydroxyazo-dyestuffs of the formula

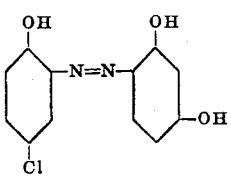

containing metal of the atomic weight 55 to 59 in complex union.

12. A composition of matter, consisting of acetate artificial silk which has been printed with ortho-hydroxyazo-dyestuffs of the formula

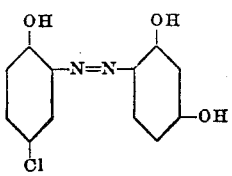

containing nickel in complex union.

WOLFGANG JAECK.
ARTHUR SCHÜRCH.